United States Patent
Bifulco (10) Patent No.: US 12,540,563 B2
(45) Date of Patent: Feb. 3, 2026

(54) BOWED ROTOR START REDUCTION VIA INTERNAL COOLING

(71) Applicant: RTX Corporation, Farmington, CT (US)

(72) Inventor: Anthony R. Bifulco, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 28 days.

(21) Appl. No.: 18/176,542

(22) Filed: Mar. 1, 2023

(65) Prior Publication Data

US 2024/0295178 A1 Sep. 5, 2024

(51) Int. Cl.
F01D 25/12 (2006.01)

(52) U.S. Cl.
CPC .......... *F01D 25/12* (2013.01); *F05D 2220/32* (2013.01); *F05D 2260/232* (2013.01)

(58) Field of Classification Search
CPC . F01D 25/12; F01D 25/14; F01D 9/04; F02C 7/18
See application file for complete search history.

(56) References Cited

U.S. PATENT DOCUMENTS

| | | | |
|---|---|---|---|
| 5,297,386 A | 3/1994 | Kervistin | |
| 8,029,234 B2 | 10/2011 | Mccaffrey | |
| 9,145,774 B2 | 9/2015 | Fuchs et al. | |
| 9,915,170 B2 * | 3/2018 | Winn | F02C 7/12 |
| 10,337,341 B2 | 7/2019 | Johnson et al. | |
| 10,443,543 B2 | 10/2019 | Virtue, Jr. et al. | |
| 10,907,545 B2 | 2/2021 | Mavuri et al. | |
| 10,914,193 B2 * | 2/2021 | Lefebvre | F01D 9/065 |
| 2012/0134777 A1 | 5/2012 | Eleftheriou | |
| 2014/0144151 A1 | 5/2014 | Bifulco | |
| 2015/0337682 A1 * | 11/2015 | Yeager | F01D 25/14 415/1 |
| 2017/0335768 A1 * | 11/2017 | Steen | F01D 9/065 |
| 2018/0216493 A1 * | 8/2018 | Moniz | F01D 9/065 |
| 2020/0263562 A1 | 8/2020 | Abrahamsson et al. | |
| 2023/0323835 A1 * | 10/2023 | Kumar | F02C 7/12 415/177 |

FOREIGN PATENT DOCUMENTS

| | | |
|---|---|---|
| DE | 102012011294 B4 | 3/2019 |
| EP | 3524779 B1 | 7/2022 |

OTHER PUBLICATIONS

Extended European Search Report for EP Application No. 24160377.8; Issue Date, Jul. 17, 2024.

* cited by examiner

*Primary Examiner* — Nathaniel E Wiehe
*Assistant Examiner* — Jackson N Gillenwaters
(74) *Attorney, Agent, or Firm* — CANTOR COLBURN LLP (57) ABSTRACT

A compressor frame of a gas turbine engine includes a radially outer ring, and a radially inner ring located radially inboard of the radially outer ring. The radially outer ring and the radially inner ring at least partially define a core flowpath of a gas turbine engine therebetween. A plurality of struts extend between the radially outer ring and the radially inner ring. At least one strut of the plurality of struts includes one or more cooling airflow nozzles configured to inject a cooling airflow into the core flowpath to cool a compressor rotor fluidly downstream of the plurality of struts.

15 Claims, 5 Drawing Sheets

BOWED ROTOR START REDUCTION VIA INTERNAL COOLING

BACKGROUND

The subject matter disclosed herein generally relates to gas turbine engines and, more particularly, to a method and an apparatus for gas turbine engine system bowed rotor start mitigation and wear reduction.

Gas turbine engines are used in numerous applications, one of which is for providing thrust to an aircraft. Gas turbine engines are typically operated while the aircraft is on the ground, such as during taxiing from a gate prior to takeoff and taxiing back to the gate after landing. Gas turbine engines are typically operated at an idle level to warm engine subsystems, operate accessory subsystems, and keep the aircraft in a ready state. In some instances, on-ground operation at idle can be for extended periods of time, particularly at busy airports. The on-ground operation at idle can result in sustained periods of non-flight fuel burn and contributes to engine wear as well as associated operating noise, tire wear, brake wear, and fuel-burn emissions.

When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components within the engine, which may result in a "bowed rotor" condition. If a gas turbine engine is in such a bowed rotor condition, it is undesirable to restart the engine. Typical approaches to reduce thermal distortion effects include waiting for a sufficiently long period of time to allow the thermal distortion to dissipate. Alternatively, active techniques can be employed to reduce thermal distortion, but such techniques can add significant delays at an airport gate or alleyway.

BRIEF DESCRIPTION

In one embodiment, a compressor frame of a gas turbine engine includes a radially outer ring, and a radially inner ring located radially inboard of the radially outer ring. The radially outer ring and the radially inner ring at least partially define a core flowpath of a gas turbine engine therebetween. A plurality of struts extend between the radially outer ring and the radially inner ring. At least one strut of the plurality of struts includes one or more cooling airflow nozzles configured to inject a cooling airflow into the core flowpath to cool a compressor rotor fluidly downstream of the plurality of struts.

Additionally or alternatively, in this or other embodiments a strut passage is formed in the at least one strut and is configured to convey the cooling airflow to the one or more cooling airflow nozzles from a cooling airflow source.

Additionally or alternatively, in this or other embodiments the strut passage is formed in the at least one strut via casting.

Additionally or alternatively, in this or other embodiments the one or more cooling airflow nozzles are located at one or more of a circumferential side of the at least one strut, or at a trailing edge of the at least one strut.

Additionally or alternatively, in this or other embodiments the at least one strut includes between two and five cooling airflow nozzles.

Additionally or alternatively, in this or other embodiments the compressor frame is one of a front center body or an intermediate case.

Additionally or alternatively, in this or other embodiments the compressor rotor is one of a low pressure compressor rotor or a high pressure compressor rotor.

In another embodiment, a cooling system of a compressor of a gas turbine engine includes a compressor frame, including a radially outer ring and a radially inner ring located radially inboard of the radially outer ring. The radially outer ring and the radially inner ring at least partially define a core flowpath of a gas turbine engine therebetween. A plurality of struts extend between the radially outer ring and the radially inner ring. At least one strut of the plurality of struts includes one or more cooling airflow nozzles configured to inject a cooling airflow into the core flowpath to cool a compressor rotor fluidly downstream of the plurality of struts. A cooling airflow source is operably connected to the one or more cooling airflow nozzles to provide the cooling airflow to the at least one strut.

Additionally or alternatively, in this or other embodiments a strut passage is formed in the at least one strut configured to convey the cooling airflow to the one or more cooling airflow nozzles from the cooling airflow source.

Additionally or alternatively, in this or other embodiments the cooling airflow source is one of a fan or an air tank operable connected to the one or more cooling airflow nozzles.

Additionally or alternatively, in this or other embodiments the cooling air source is an external air cart with a fan or compressor which is operably connected to the one or more cooling airflow nozzles.

Additionally or alternatively, in this or other embodiments the one or more cooling airflow nozzles is disposed at one or more of a circumferential side of the at least one strut or at a trailing edge of the at least one strut.

Additionally or alternatively, in this or other embodiments the at least one strut includes between two and five cooling airflow nozzles.

Additionally or alternatively, in this or other embodiments the compressor frame is one of a front center body or an intermediate case.

Additionally or alternatively, in this or other embodiments the compressor rotor is one of a low pressure compressor rotor or a high pressure compressor rotor.

In another embodiment, a method of cooling a compressor of a gas turbine engine, includes providing one or more cooling airflow nozzles in a compressor frame of a gas turbine engine. The compressor frame includes a radially outer ring and a radially inner ring located radially inboard of the radially outer ring. The radially outer ring and the radially inner ring at least partially define a core flowpath of a gas turbine engine therebetween. A plurality of struts extend between the radially outer ring and the radially inner ring. At least one strut of the plurality of struts includes the one or more cooling airflow nozzles. A cooling airflow is directed from a cooling airflow source to the one or more cooling airflow nozzles, and the cooling airflow is emitted from the one or more cooling airflow nozzles toward a compressor rotor located downstream of the plurality of struts. The compressor rotor is cooled via the cooling airflow.

Additionally or alternatively, in this or other embodiments the cooling airflow is directed from the cooling airflow source to the one or more cooling airflow nozzles via a cooling airflow passage formed in the at least one strut.

Additionally or alternatively, in this or other embodiments the cooling airflow source is one of a fan or an air tank operable connected to the one or more cooling airflow nozzles.

Additionally or alternatively, in this or other embodiments the compressor frame is one of a front center body or an intermediate case.

Additionally or alternatively, in this or other embodiments operation of the gas turbine engine is stopped before directing the cooling airflow from a cooling airflow source to the one or more cooling airflow nozzles.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
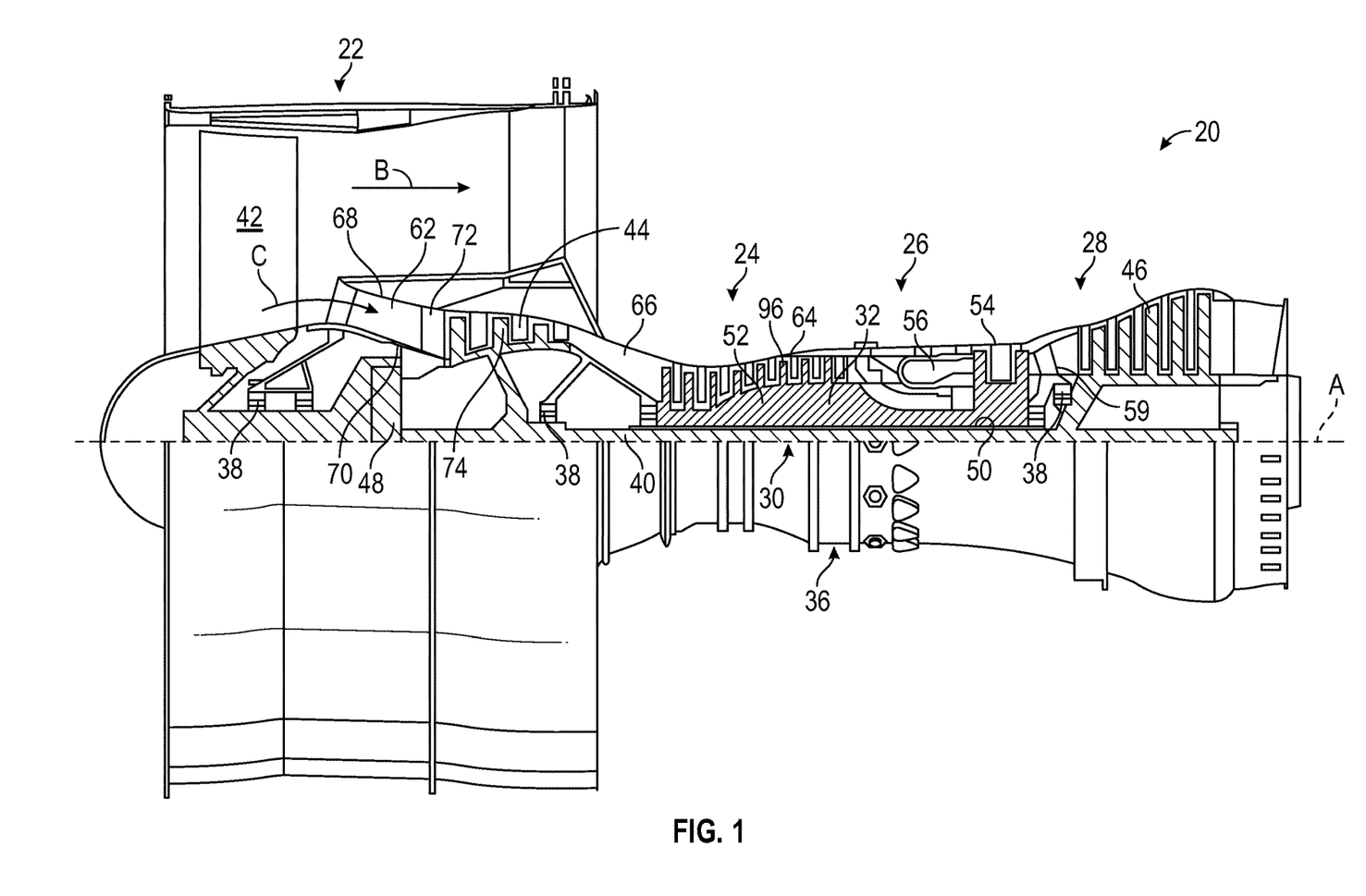
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans. The engine 20 includes a number of substantially tubular casing elements that enclose portions of the engine 20, such as a first compressor frame, also referred to as a front center body 62 that encloses the low pressure compressor 44, a compressor case 64 that encloses the high pressure compressor 52, and a second compressor frame, also referred to as an intermediate case 66 that encloses an intermediate portion of the core section of the engine 20, and is located axially between the low pressure compressor 44 and the high pressure compressor 52.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second (350.5 m/sec).

Figure 2:
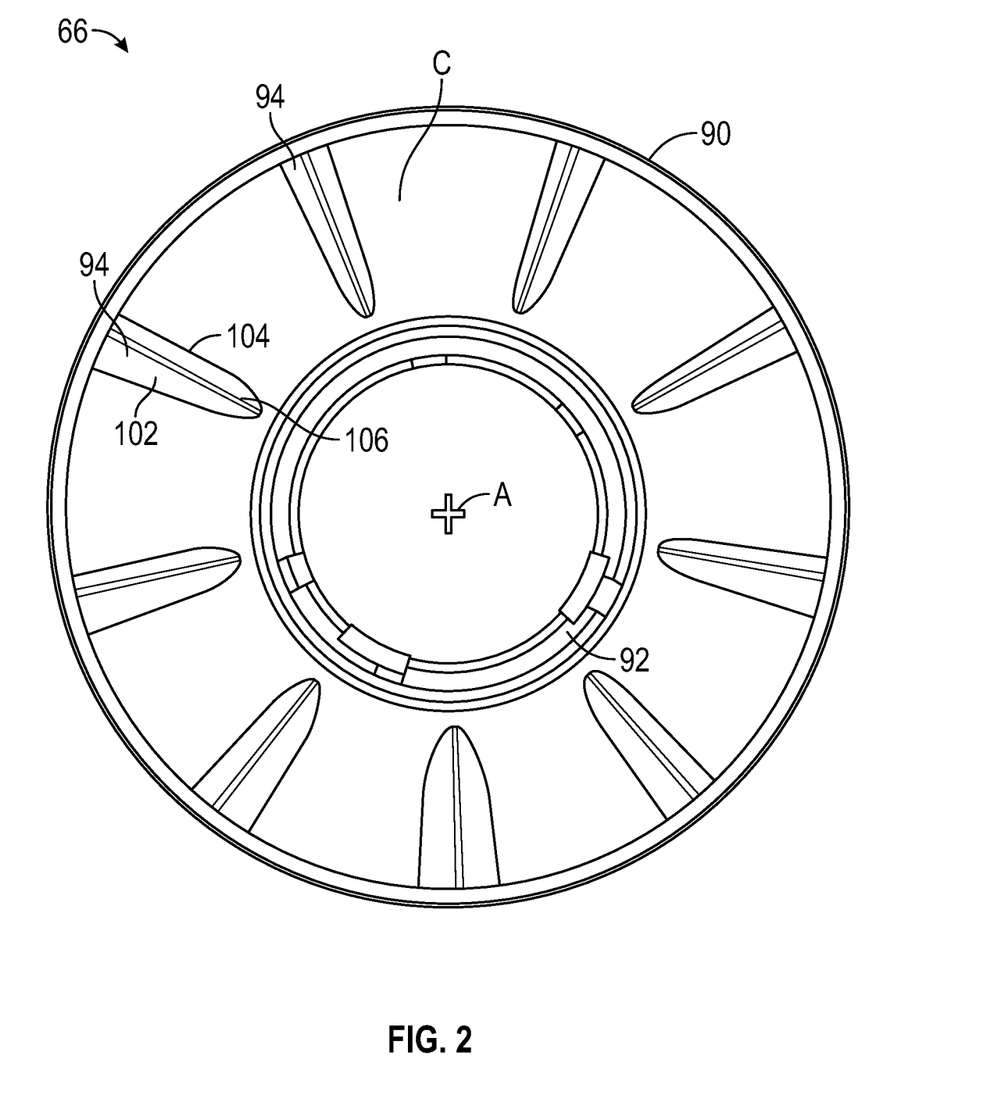
FIG. 2 is a partial end view of an embodiment of an intermediate case of a gas turbine engine.

Referring to the end view of FIG. 2, the intermediate case 66 is generally annular and includes an outer case ring 90 and an inner case ring 92 located radially inboard of the outer case ring 90. The outer case ring 90 and the inner case ring 92 define a portion of the core flowpath C therebetween. To support the outer case ring 90 relative to the inner case ring 92, a plurality of intermediate case struts 94 extend between the inner case ring 92 and the outer case ring 90. Some embodiments, such as shown in FIG. 2, include 9 intermediate case struts 94 equally circumferentially spaced apart relative to the engine central longitudinal axis A. In other embodiments, the number of intermediate case struts 94 may vary to include, for example, other numbers of intermediate case struts 94 such as 2 or more intermediate case struts 94 to provide the needed structural support while also providing the selected flow characteristics through the intermediate case 66. While in some embodiments the intermediate case struts 94 may be equally circumferentially spaced, in other embodiments the circumferential spacing may vary.

Figure 3:
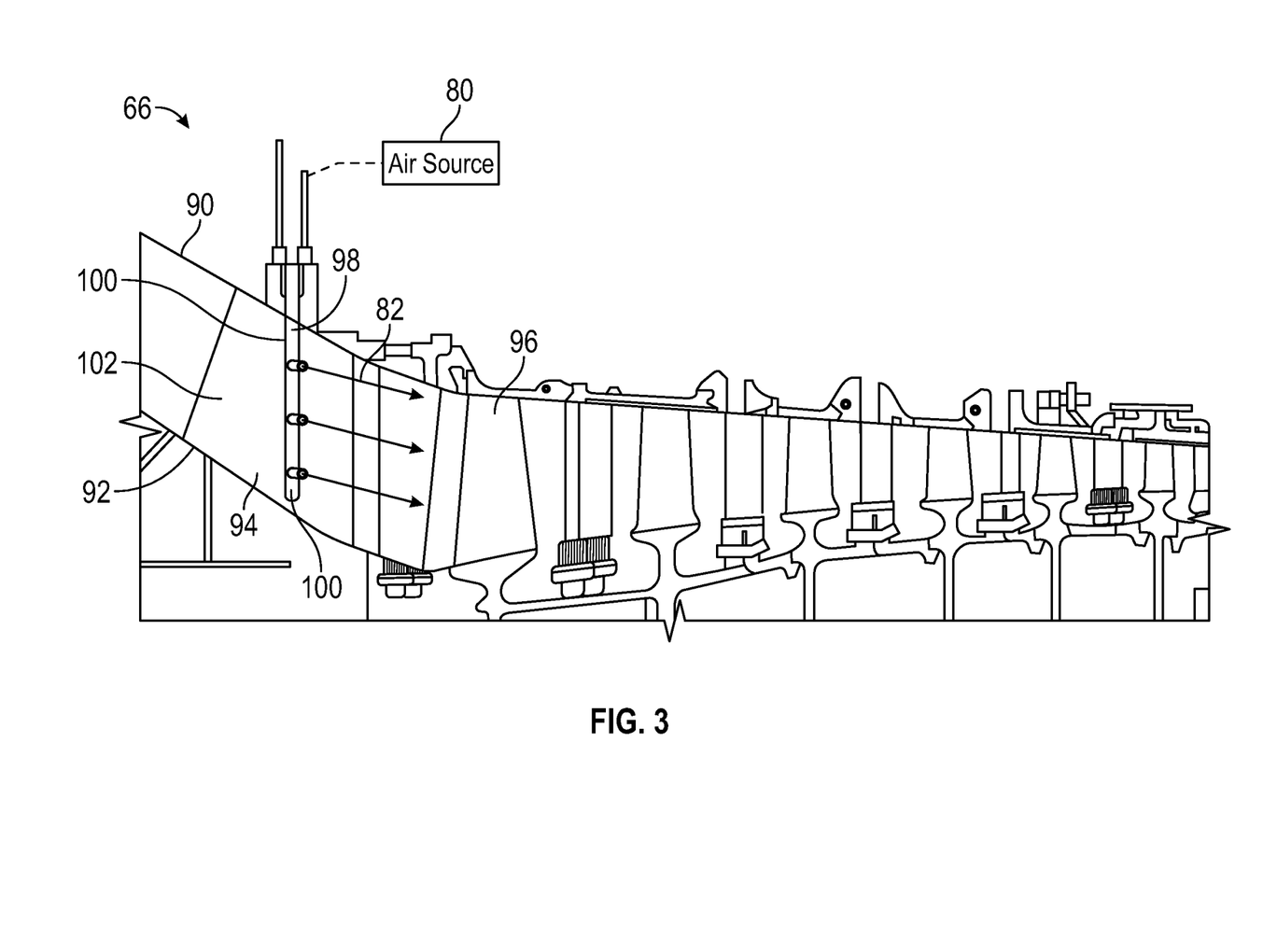
FIG. 3 is a partial cross-sectional view of an embodiment of an intermediate case of a gas turbine engine.

The intermediate case struts 94 include features to selectably inject a cooling airflow into the core flowpath C to cool the high pressure compressor 52 when the engine 20 is stopped. Cooling of the high pressure compressor 52, especially a high pressure compressor rotor 96 (shown in FIG. 1), reduces incidence of bowed rotor conditions, reducing component wear and allowing normal start procedures to be used. Referring to FIG. 3, illustrated is an exemplary embodiment of an intermediate case strut 94.

The intermediate case strut 94 includes one or more intermediate case strut passages 98 defined internal to the intermediate case strut 94. In some embodiments, the intermediate case strut passages 98 are formed in the casting process of the intermediate case 66. The intermediate case strut passages 98 are connected to one or more intermediate case strut openings 100 or nozzles on an exterior surface of the intermediate case strut 94. The intermediate case strut passages 98 are fluidly connected to the cooling air source 80, which is selectably operable when the engine 20 is not operating, such as when the engine 20 has been shut down or turned off. When the engine 20 is stopped, a cooling air source 80 is connected to the intermediate case strut passages 98, and cooling airflow 82 from the cooling air source 80 is flowed along the intermediate case strut passages 98 and out of the intermediate case strut openings 100. The cooling air source 80 may be one or more of several devices operably connected to the intermediate case strut passages 98. In some embodiments, the cooling air source 80 is an onboard tank of compressed air that may be located within the nacelle of the engine 20, or alternatively located remotely from the engine 20. In other embodiment, the cooling air source 80 may be one or more of a supply fan or an external air cart with a fan or compressor which is operably connected to the intermediate case strut passages 98.

The intermediate case strut openings 100 direct the cooling airflow 82 across the high pressure compressor 52 to cool the high pressure compressor 52, thus preventing a bowed rotor condition.

In the embodiment of FIG. 3, three intermediate case strut openings 100 are shown on the intermediate case strut 94, but one skilled in the art will readily appreciate that other numbers of intermediate case strut openings 100 may be utilized on the intermediate case strut 94. Further, in the embodiment of FIG. 3, the intermediate case strut openings 100 are located on a first circumferential side 102 of the intermediate case strut 94. One skilled in the art, however, will readily appreciate that the intermediate case strut openings 100 may alternatively be located at a second circumferential side 104 (shown in FIG. 2) of the intermediate case strut 94, or at a trailing edge 106 of the intermediate case strut 94. The location, quantity, position, size and shape of the intermediate case strut openings 100 may be varied to achieve a desired cooling performance to cool the high pressure compressor 52, while not effecting the aerodynamic or structural performance of the intermediate case struts 94. Referring again to FIG. 2, in some embodiments each intermediate case strut 94 includes one or more intermediate case strut openings 100. In other embodiments, however, only a selected number of the intermediate case struts 94, for example, two or four of the intermediate case struts 94, include intermediate case strut openings 100.

Figure 4:
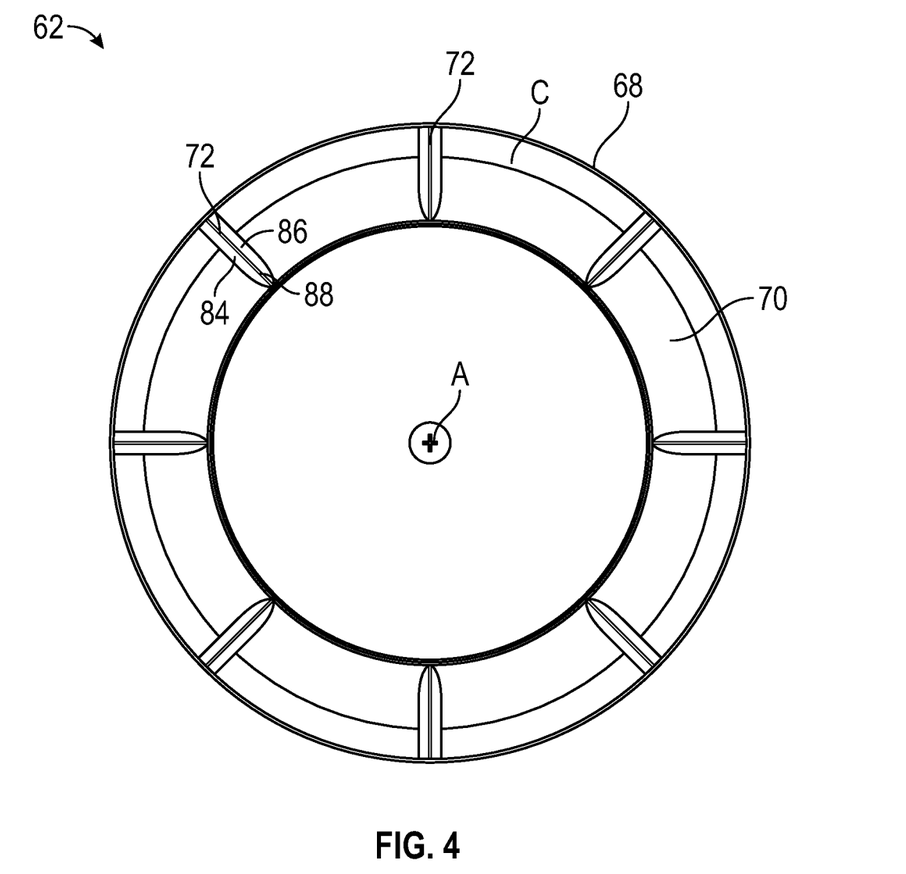
FIG. 4 is a partial end view of an embodiment of a front center body of a gas turbine engine.

While the non-uniform cooling of the high pressure compressor 52 is a major contributor to bowed rotor conditions, in some configurations the non-uniform cooling of the low pressure compressor 44 may also be a contributor. As such, it may be beneficial to incorporate a similar configuration into the front center body 62. Referring to the end view of FIG. 4, the front center body (FCB) 62 is generally annular and includes an outer body ring 68 and an inner body ring 70 located radially inboard of the outer body ring 68. The outer body ring 68 and the inner body ring 70 define a portion of the core flowpath C therebetween. To support the outer body ring 68 relative to the inner body ring 70, a plurality of FCB struts 72 extend between the inner body ring 70 and the outer body ring 68. Some embodiments, such as shown in FIG. 2, include 8 FCB struts 72 equally circumferentially spaced apart relative to the engine central longitudinal axis A. In other embodiments, the number of FCB struts 72 may vary to include, for example, other numbers of FCB struts 72 such as 2 or more FCB struts 72 to provide the needed structural support while also providing the selected flow characteristics through the FCB 62. While in some embodiments the FCB struts 72 may be equally circumferentially spaced, in other embodiments the circumferential spacing may vary.

Figure 5:
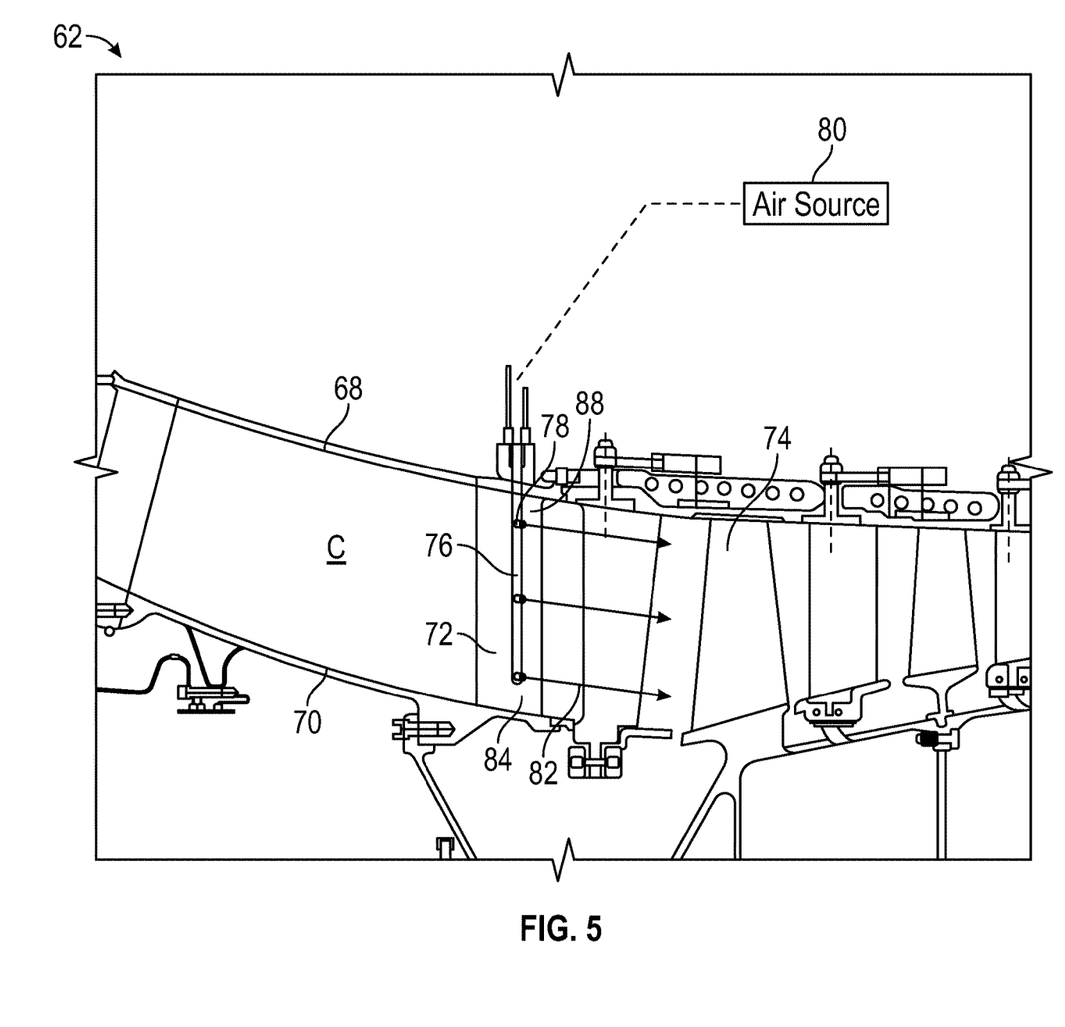
FIG. 5 is a partial cross-sectional view of an embodiment of a front center body of a gas turbine engine.

The FCB struts 72 include features to selectably inject a cooling airflow into the core flowpath C to cool the low pressure compressor 44 when the engine 20 is stopped. Cooling of the low pressure compressor 44, especially a low pressure compressor rotor 74 (shown in FIG. 1), reduces incidence of bowed rotor conditions, reducing component wear and allowing normal start procedures to be used. Referring to FIG. 5, illustrated is an exemplary embodiment of an FCB strut 72.

The FCB strut 72 includes one or more FCB strut passages 76 defined internal to the FCB strut 72. In some embodiments, the FCB strut passages 76 are formed in the casting process of the FCB 62. The FCB strut passages 76 are connected to one or more FCB strut openings 78 or nozzles on an exterior surface of the FCB strut 72. The FCB strut passages 76 are fluidly connected to the cooling air source 80, which is selectably operable when the engine 20 is not operating, such as when the engine 20 has been shut down or turned off. When the engine 20 is stopped, the cooling air source 80 is connected to the FCB strut passages 76, and cooling airflow 82 from the cooling air source 80 is flowed along the FCB strut passages 76 and out of the FCB strut openings 78. The FCB strut openings 78 direct the cooling airflow 82 across the low pressure compressor 44 to cool the low pressure compressor 44, thus preventing a bowed rotor condition. In some embodiments, the cooling air source 80 is, for example, a cooling air tank onboard the engine 20 or aircraft, on or more fans to drive the cooling airflow 82, or an external air tank or pumping cart connectible to the engine 20 when the engine 20 is on the ground.

In the embodiment of FIG. 5, three FCB strut openings 78 are shown on the FCB strut 72, but one skilled in the art will readily appreciate that other numbers of FCB strut openings 78 may be utilized on the FCB strut 72. Further, in the embodiment of FIG. 3, the FCB strut openings 78 are located on a first circumferential side 84 of the FCB strut 72. One skilled in the art, however, will readily appreciate that the FCB strut openings 78 may alternatively be located at a second circumferential side 86 (shown in FIG. 4) of the FCB strut 72, or at a trailing edge 88 of the FCB strut 72. The location, quantity, position, size and shape of the FCB strut openings 78 may be varied to achieve a desired cooling performance to cool the low pressure compressor 44, while not effecting the aerodynamic or structural performance of the FCB struts 72. Referring again to FIG. 4, in some embodiments each FCB strut 72 includes one or more FCB strut openings 78. In other embodiments, however, only a selected number of the FCB struts 72, for example, two or four of the FCB struts 72, include FCB strut openings 78.

The intermediate case strut openings 100 and the FCB strut openings 78 may be incorporated into the engine 20 in multiple configurations. In some embodiments, the engine 20 includes only intermediate case strut openings 100, which aids in reducing bow conditions in the high pressure compressor 54. In other embodiments, the engine includes only FCB strut openings 78, which aids in reducing bow conditions in the low pressure compressor 44. In yet other embodiments, the engine 20 may include both intermediate case strut openings 100 and FCB strut openings 78, which permits maximum cooling airflow 82 and thus results in faster more uniform cooling. Further, while the intermediate case strut openings 100 and the FCB strut openings 78 are utilized as described herein to convey cooling airflow 82, in some embodiments the openings are additionally utilized to convey washing fluid for cleaning of the engine 20, or for other uses. For example, in some embodiments the intermediate case strut openings 100 and/or the FCB strut openings 78 may be utilized to inject fluid into the core flowpath C to increase thrust or to remove particulates from the core flowpath C.

Utilizing the opening or nozzle features in the case struts allows for the provision of a cooling airflow to the compressor rotors of the engine 20, which accounts for majority of bowed rotor start clearance effects. Maintaining the environment through the rotor will equalize thermal expansion and reduce the induced bow of the rotor, thus avoiding excessive rub interaction of blade tips to case abradable airseals that results in more open clearances and reduced stability and performance of the compressor. Generally reducing the overall temperature of the rotor will also provide benefits as the cooled rotor will also experience less radial thermal increase in diameter. Therefore start clearances along the length of the compressor will be more open, permitting more utilization of standard cold rotor start procedures.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor case of a gas turbine engine, comprising:
   a radially outer ring;
   a radially inner ring located radially inboard of the radially outer ring, the radially outer ring and the radially inner ring at least partially defining a core flowpath of the gas turbine engine therebetween, the core flowpath configured to direct compressed airflow to a combustor of the gas turbine engine; and
   a plurality of struts connecting the radially outer ring and the radially inner ring, at least one strut of the plurality of struts including one or more cooling airflow nozzles configured to inject a cooling airflow into the core flowpath to cool a compressor rotor fluidly downstream of the plurality of struts, relative to a flow direction of airflow along the core flowpath of the gas turbine engine;
   wherein the one or more cooling airflow nozzles are configured such that the cooling airflow exits the one or more cooling airflow nozzles in an axial direction along the core flowpath,
   wherein the compressor case is a front center body;
   and wherein the compressor rotor is a low pressure compressor.

2. The compressor case of claim 1, further comprising a strut passage formed in the at least one strut configured to convey the cooling airflow to the one or more cooling airflow nozzles from a cooling airflow source.

3. The compressor case of claim 2, wherein the strut passage is formed in the at least one strut via casting.

4. The compressor case of claim 1, wherein the one or more cooling airflow nozzles is disposed at a circumferential side of the at least one strut.

5. The compressor case of claim 1, wherein the at least one strut includes between two and five cooling airflow nozzles.

6. A cooling system of a compressor of a gas turbine engine, comprising:
   a compressor case, including:
   a radially outer ring;
   a radially inner ring located radially inboard of the radially outer ring, the radially outer ring and the radially inner ring at least partially defining a core flowpath of the gas turbine engine therebetween, the core flowpath configured to direct compressed airflow to a combustor of the gas turbine engine; and a plurality of struts connecting the radially outer ring and the radially inner ring, at least one strut of the plurality of struts including one or more cooling airflow nozzles configured to inject a cooling airflow into the core flowpath to cool a compressor rotor fluidly downstream of the plurality of struts, relative to a flow direction of airflow along the core flowpath of the gas turbine engine; and a cooling airflow source operably connected to the one or more cooling airflow nozzles to provide the cooling airflow to the at least one strut;

wherein the one or more cooling airflow nozzles are configured such that the cooling airflow exits the one or more cooling airflow nozzles in an axial direction along the core flowpath;

wherein the compressor case is a front center body; and wherein the compressor rotor is a low pressure compressor.

7. The cooling system of claim 6, further comprising a strut passage formed in the at least one strut configured to convey the cooling airflow to the one or more cooling airflow nozzles from the cooling airflow source.

8. The cooling system of claim 6, wherein the cooling airflow source is one of a fan or an air tank operable connected to the one or more cooling airflow nozzles.

9. The cooling system of claim 6, wherein the cooling airflow source is an external air cart with a fan or compressor which is operably connected to the one or more cooling airflow nozzles.

10. The cooling system of claim 6, wherein the one or more cooling airflow nozzles is disposed at a circumferential side of the at least one strut.

11. The cooling system of claim 6, wherein the at least one strut includes between two and five cooling airflow nozzles.

12. A method of cooling a compressor of a gas turbine engine, comprising:

providing one or more cooling airflow nozzles in a compressor case of the gas turbine engine, the compressor case including:

a radially outer ring;

a radially inner ring located radially inboard of the radially outer ring, the radially outer ring and the radially inner ring at least partially defining a core flowpath of the gas turbine engine therebetween, the core flowpath configured to direct compressed airflow to a combustor of the gas turbine engine; and a plurality of struts connecting the radially outer ring and the radially inner ring, at least one strut of the plurality of struts including the one or more cooling airflow nozzles;

directing a cooling airflow from a cooling airflow source to the one or more cooling airflow nozzles;

emitting the cooling airflow from the one or more cooling airflow nozzles toward a compressor rotor disposed downstream of the plurality of struts, relative to a flow direction of airflow along the core flowpath of the gas turbine engine; and cooling the compressor rotor via the cooling airflow;

wherein the one or more cooling airflow nozzles are configured such that the cooling airflow exits the one or more cooling airflow nozzles in an axial direction along the core flowpath;

wherein the compressor case is a front center body; and wherein the compressor rotor is a low pressure compressor.

13. The method of claim 12, further comprising directing the cooling airflow from the cooling airflow source to the one or more cooling airflow nozzles via a cooling airflow passage formed in the at least one strut.

14. The method of claim 12, wherein the cooling airflow source is one of a fan or an air tank operable connected to the one or more cooling airflow nozzles.

15. The method of claim 12, further comprising stopping operation of the gas turbine engine before directing the cooling airflow from a cooling airflow source to the one or more cooling airflow nozzles.

* * * * *